United States Patent
Ginsberg et al.

(10) Patent No.: US 9,182,290 B2
(45) Date of Patent: Nov. 10, 2015

(54) METHODS AND APPARATUSES FOR MONITORING NUCLEAR REACTOR CORE CONDITIONS

(75) Inventors: Robert J. Ginsberg, Wilmington, NC (US); John R. Bass, Wilmington, NC (US); Mark A. Bergman, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 1078 days.

(21) Appl. No.: 13/340,678

(22) Filed: Dec. 30, 2011

(65) Prior Publication Data

US 2013/0170596 A1    Jul. 4, 2013

(51) Int. Cl.
| | | |
|---|---|---|
| G01C 17/00 | (2006.01) | |
| G01K 1/02 | (2006.01) | |
| G01K 13/00 | (2006.01) | |
| G21C 17/112 | (2006.01) | |

(52) U.S. Cl.
CPC ............. *G01K 1/026* (2013.01); *G01K 13/00* (2013.01); *G21C 17/112* (2013.01)

(58) Field of Classification Search
CPC ....... G21C 17/112; G01K 13/00; G01K 1/026
USPC .......................................................... 376/247
See application file for complete search history.

(56) References Cited

U.S. PATENT DOCUMENTS

| | | | | |
|---|---|---|---|---|
| 3,599,474 | A * | 8/1971 | Brown et al. ................... | 374/30 |
| 4,038,133 | A * | 7/1977 | Bittermann et al. .......... | 376/363 |
| 4,406,011 | A | 9/1983 | Burns | |
| 4,418,035 | A * | 11/1983 | Smith ........................... | 376/247 |
| 4,751,039 | A * | 6/1988 | Delevallee et al. ........... | 376/261 |
| 5,078,957 | A * | 1/1992 | Tower et al. .................. | 376/254 |
| 5,084,228 | A * | 1/1992 | Lhwillier ...................... | 376/203 |
| 5,473,644 | A * | 12/1995 | Yasuoka et al. ............... | 376/254 |
| 2005/0187730 | A1 | 8/2005 | Morton | |
| 2008/0107225 | A1 | 5/2008 | Hashemian | |
| 2008/0177493 | A1 | 7/2008 | Shumaker | |
| 2008/0253497 | A1 | 10/2008 | Singleton | |

OTHER PUBLICATIONS

J. E. Villard et al., Improving High-Temperature Measurements in Nuclear Reactors with Mo/Nb Thermocouples, Int. J. Thermophys., Apr. 23, 2008, Springer Science+Business Media LLC.
Office Action in related EPO Application 12197446.3, Jul. 21, 2015.

* cited by examiner

*Primary Examiner* — Frank J McGue
(74) *Attorney, Agent, or Firm* — Ryan Alley Intellectual Property Law

(57) ABSTRACT

A temperature sensor array includes several temperature sensors at different positions for installation within an instrumentation tube of a nuclear reactor. The temperature sensors measure temperature at multiple axial positions of the nuclear reactor, and plant operators are able to access and interpret this measurement data. Temperatures associated with vessel coolant boiling or loss and/or fuel damage can be detected by the temperature sensors to permit more direct determinations of core fluid levels. Multiple temperature sensor arrays permit vessel fluid levels and conditions to be measured at multiple core locations.

19 Claims, 3 Drawing Sheets

METHODS AND APPARATUSES FOR MONITORING NUCLEAR REACTOR CORE CONDITIONS

BACKGROUND

FIG. 1 is an illustration of a conventional nuclear reactor pressure vessel 10 usable with example embodiments and example methods. Reactor pressure vessel 10 may be, for example, a 100+ MWe commercial light water nuclear reactor conventionally used for electricity generation throughout the world. Reactor pressure vessel 10 is conventionally contained within a containment structure 411 that serves to contain radioactivity. A building surrounding the reactor vessel 10, known as a primary containment 411 with drywell 20, serves to house equipment servicing the vessel such as pumps, drains, control rod drives etc.

As shown in FIG. 1 and as defined herein, at least one instrumentation tube 50 extends into the vessel 10 with core 15 containing nuclear fuel. As existing in conventional nuclear power reactors and as defined herein, instrumentation tubes are enclosed within vessel 10 and open outside of vessel 10, permitting spatial access to positions proximate to core 15 from outside vessel 10 while still being physically separated from innards of the reactor and core by instrumentation tube 50. Instrumentation tubes 50 may be generally cylindrical and widen with height of the vessel 10; however, other instrumentation tube geometries are commonly encountered in the industry.

Conventionally, instrumentation tubes 50 permit neutron detectors to be inserted therein through an opening at a lower end in the drywell 20. These detectors extend up through instrumentation tubes 50 to monitor neutron flux in the core 15 at a desired axial position. Examples of conventional monitor types include wide range detectors (WRNM), source range monitors (SRM), intermediate range monitors (IRM), and/or Local Power Range Monitors (LPRM). Additionally, in Pressurized Water Reactors, where vessel 10 is continuously filled with liquid water, a thermocouple monitor, called a Core Exit Thermocouple (CET) may be inserted into a top of instrumentation tube 50 to monitor outlet temperature of the liquid exiting the reactor for steam generators.

As shown in FIG. 1, vessel 10 may include a downcomer region 30 in an annular space separated from core 15 where fluid moderator and/or coolant may enter from a recirculation loop and flow down through downcomer region 30 to a bottom entry point into core 15. Conventionally, downcomer region 30 is outfitted with one or more liquid sensors that permit measurement of liquid presence at a particular level in downcomer region 30. By measuring a liquid level in downcomer region 30, plant operators may be able to approximate a corresponding fluid level in core 15 because core 15 and downcomer region 30 are in fluid connection. This measurement from liquid levels in downcomer region 30 may be used to appropriately operate reactor 10 and/or respond to transient situations where loss of fluid level in core 15 is a concern.

SUMMARY

Example embodiments include methods and systems for monitoring nuclear reactors with one or more temperature sensor arrays. Example embodiment temperature sensor arrays include a plurality of temperature sensors extending along an axis, so as to measure temperature at several axial positions within an instrumentation tube of the nuclear reactor. As such, example embodiments are shaped, sized, and fabricated of materials compatible with insertion into an instrumentation tube and operating nuclear reactor environment. Example embodiment arrays may be fashioned in several different physical configurations and may include a rod joining all the temperature sensors and their leads for data output. The temperature sensors can be self-powered thermocouples or other types of sensors capable of determining temperatures at their respective axial position. In this way, temperatures associated with coolant absence or core uncovering can be detected at several axial positions to measure coolant level at one or more core positions. Example embodiments are useable in any reactor where instrumentation tubes are present and temperatures can be correlated with coolant and/or moderator levels.

Example methods include installing multiple temperature sensors within an instrumentation tube to permit monitoring axial temperatures within an associated nuclear reactor. More than one instrumentation tube may be used, so that axial temperature profiles at several core positions can be measured in example methods. Measured temperatures may then be correlated into an absence of coolant condition or general core fluid level. Plant operators may operate the reactor or respond to transient scenarios using the determined core levels.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1:
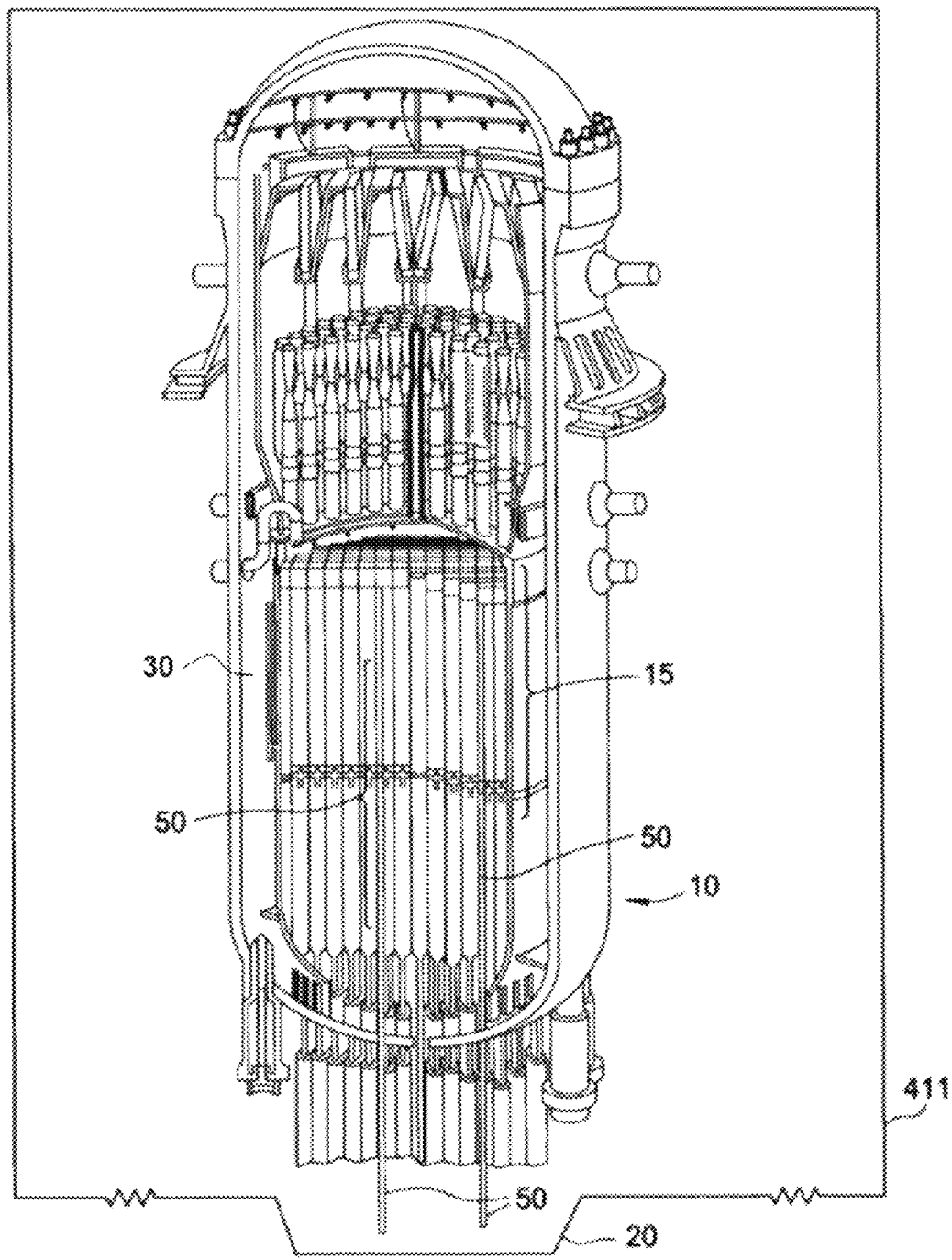
FIG. 1 is an illustration of a conventional commercial nuclear reactor.

This is a patent document, and general broad rules of construction should be applied when reading and understanding it. Everything described and shown in this document is an example of subject matter falling within the scope of the appended claims. Any specific structural and functional details disclosed herein are merely for purposes of describing how to make and use example embodiments. Several different embodiments not specifically disclosed herein fall within the claim scope; as such, the claims may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.). Similarly, a term such as "communicatively connected" includes all variations of information exchange routes between two devices, including intermediary devices, networks, etc., connected wirelessly or not.

As used herein, the singular forms "a", "an" and "the" are intended to include both the singular and plural forms, unless the language explicitly indicates otherwise with words like "only," "single," and/or "one." It will be further understood that the terms "comprises", "comprising,", "includes" and/or "including", when used herein, specify the presence of stated features, steps, operations, elements, ideas, and/or components, but do not themselves preclude the presence or addition of one or more other features, steps, operations, elements, components, ideas, and/or groups thereof.

It should also be noted that the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from the single operations described below. It should be presumed that any embodiment having features and functionality described below, in any workable combination, falls within the scope of example embodiments.

Applicants have recognized that coolant level within a core, such as core 15 of reactor 10 shown in FIG. 1, is a critically important metric for measuring and responding to reactor operation and transients. Coolant level within a core may dictate whether additional make-up coolant should be added and/or reflect the likelihood of fuel within the core becoming uncovered by coolant and subject to overheat and/or damage. Applicants have further recognized that measurement of fluid levels within a downcomer region may be inaccurate or lack desired precision due to fluid coolant blockage with the reactor, backup into downcomer region, overpressure, etc. Applicants have further recognized that more direct or accurate measurement of fluid coolant levels within a core through measurement of temperature at multiple core axial positions may be more precise than measuring fluid levels from a downcomer region within a reactor. Example embodiments and methods discussed below enable these and other advantages and solutions to problems appreciated by Applicants.

Figure 2:
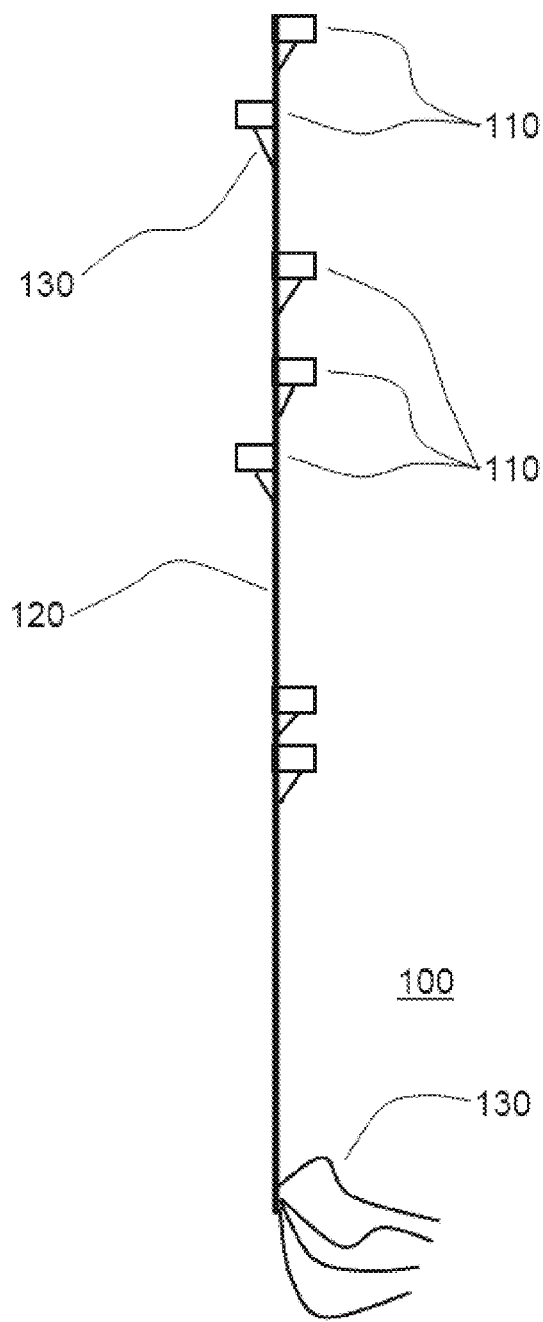
FIG. 2 is an illustration of an example embodiment temperature sensor array.

FIG. 2 is an illustration of an example embodiment temperature sensor array 100. As shown in FIG. 2, example embodiment temperature sensor array 100 includes a plurality of temperature sensors 110 arrayed at discrete axial positions. Example embodiment temperature sensor array 100 may include an axial column 120 or other connection mechanism that permits temperature sensors 110 to be moved as a group and/or maintained at a desired axial interval(s). For example, axial column 120 may be a flexible metallic rod, a taught wire, a rigid polymer, etc. Similarly, axial column 120 may be a segmented or continuous structure having a total length approximately equal to a length of instrumentation tube 50 such that temperature sensors 110 arrayed thereon will extend at various axial positions within instrumentation tube 50.

Example embodiment temperature sensor array 100 may further include one or more communications connectors 130 that communicatively connect temperature sensors 110 to an external monitor for reading. For example, communications connectors 130 may be a coaxial cable, fiber-optic cable, thermocouple lead, sensor output wire, etc. secured to axial column 120. A single communications connector 130 may connect to multiple temperature sensors 110, and/or one-to-one relationships between connectors 130 and sensors 110 may be used in example embodiments. As shown in FIG. 2, communications connector 130 may extend from a terminal end of example embodiment temperature sensor array 100 so as to exit an instrumentation tube 50 (FIG. 1) into which an array is inserted and communicatively connect to a monitor or reading device remote from a reactor vessel 10 (FIG. 1) and potentially even outside of containment 411 (FIG. 1).

Although example embodiment temperature sensor array 100 is shown in FIG. 2 with multiple temperature sensors 110 at regular intervals on an axial column 120 with individual communications connectors 130 for each temperature sensor 110, it is understood that different numbers and positions of temperature sensors 110 may be used in example embodiments. Similarly, axial column 120 and/or communications connectors 130 may be varied in any physical form or absent entirely in example embodiments. For example, bare temperature sensors 110 may be connected at axial intervals to an instrumentation tube 50 and wirelessly connected to operator monitoring devices in example embodiments.

Figure 3:
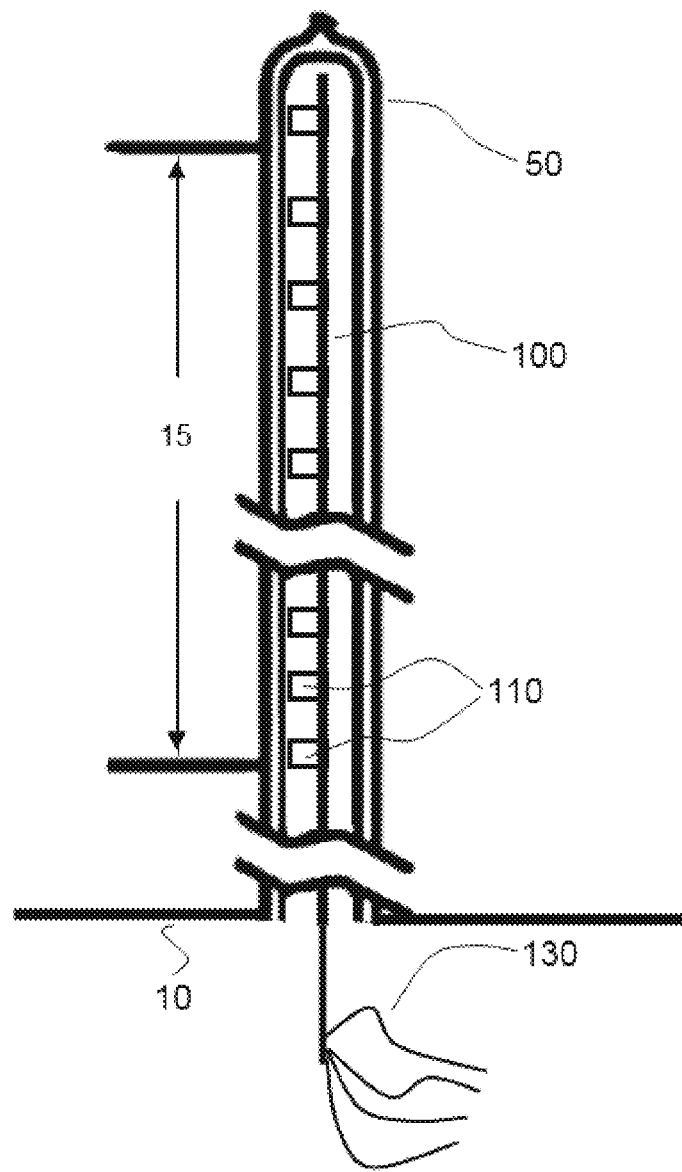
FIG. 3 is an illustration of an example embodiment reactor using an example embodiment temperature sensor array.

As shown in FIG. 3, example embodiment temperature sensor array 100 is dimensioned and shaped to be inserted and fit within an instrumentation tube 50 of nuclear reactor 10. For example, instrumentation tube 50 may have an inner diameter of approximately 1 inch and a length of several yards, and example embodiment temperature sensor array 100 may have a width of less than 1 inch and a length of approximately several yards.

Example embodiment temperature sensor array 100 is further formed of materials that substantially maintain their physical characteristics in an operating nuclear reactor environment. For example, ceramic composites, carbon steel, stainless steel, and/or aluminum alloys having higher melting temperatures and minimum radiation absorption cross-sections may reside within instrumentation tube 50 during operating and even transient conditions without melting, becoming radioactive, or otherwise failing for a lengthy period of time.

Temperature sensors 110 may be any type of instrument capable of measuring and recording/transmitting temperatures in a range encountered in operating nuclear reactors under both steady-state and transient conditions. For example, temperature sensors 110 may be resistance temperature detectors, thermistors, and/or thermocouples. Temperature sensors 110 may be locally powered, such as through a battery, or remotely powered, such as through communications connectors 130, for example. Some temperature sensors, such as thermocouples, may offer further advantages of being self-powered and thus requiring no external power source, while still being resilient and capable of measuring wide temperature ranges encountered in nuclear reactor environments.

As shown in FIG. 3, example embodiment temperature sensor array 100 is inserted into an instrumentation tube 50 such that temperature sensors 110 are present at several desired axial positions within and outside of core 15. For example, if a core 15 is approximately 4 yards in axial length, twelve temperature sensors 110 can be present in an example embodiment, one at each foot of core 15 to measure core temperature in one-foot increments. By measuring ambient temperature or temperature of instrumentation tube 50, temperature sensors 110 may be able to directly measure and transmit/record the temperature of core 15 at particular axial positions. Of course, temperature sensors 110 may also be present at non-core axial positions and at any interval(s) within instrumentation tube 50 and example embodiments.

Example methods include using example embodiment temperature sensor array 100 and/or other temperature sensor arrays in nuclear power plants for monitoring. For example, as shown in FIG. 3, temperature sensor arrays may be inserted or installed in instrumentation tubes 50. Individual temperature sensors 110 may be installed within the instrumentation tube 50, or, in the instance of example embodiment temperature sensor array 100 having a uniting and flexible axial column 120, temperature sensors 110 may be inserted together by inserting axial column 120 into an instrumentation tube 50 such that temperature sensors 110 have desired axial positions within reactor 10. Multiple example embodiment temperature sensor arrays may be installed within any reactor. For example, at least one array may be installed within an instrumentation tube in each quadrant of a core 15 in order to monitor temperatures and thus axial coolant levels across several radial core positions.

Example methods may further include communicatively connecting temperature sensors to a monitor or recording device. For example, communicative connectors 130 may be run from temperature sensors 110 to an external monitoring or recording device in order to record and/or determine temperatures within a reactor at several axial positions. Alternatively, temperature sensors 110 may store temperatures locally or transmit measurements wirelessly such that no physical communicative connectors 130 need be used.

Example methods may further include user monitoring or reception of temperatures measured by temperature sensors at several axial levels within instrumentation tube 50. The temperature measurements may be used to determine fluid levels within reactor 10. For example, rapidly-increasing temperatures beyond a coolant boiling point may indicate that a particular axial position within a reactor has become uncovered by coolant. Similarly, temperatures beyond a zirconium-alloy creep failure temperature may indicate that a particular axial position within the reactor may be subject to fuel failure. As an example, temperature sensors useable in example embodiments may have a range of approximately 100 to 3000 degrees Fahrenheit to detect conditions ranging from low power operations up to zirconium oxidation temperatures. Depending on distance(s) between temperature sensors, fluid levels within a core 15 and vessel 10 may be determined from temperature at any number and granularity of axial positions in order to better understand the need for coolant injection to avoid overheating damage to reactor components. Similarly, use of multiple arrays in different instrumentation tubes in different core quadrants may permit detection of varying coolant levels and potential core blockage and/or damage that varies between different core quadrants.

Monitoring temperatures and correlating the same to coolant levels, coolant condition, fuel damage, or any other metric indicated by temperate within nuclear reactors may be performed in real time, such as through control room monitors communicatively connected to temperature sensors in example embodiments. Similarly, reading measurements from temperature sensors in example embodiments may be performed post-measurement for historical temperature data. For example, in a simple/passive example embodiment, thermocouple temperature sensors may display indicia when a temperature corresponding to coolant absence is detected; such example embodiments can be withdrawn from instrumentation tubes and read by inspection on a need basis, such as during a transient scenario where instrumentation power is lost and/or damage occurs within the vessel to render downcomer fluid level measurements unreliable and where vessel coolant levels are critical. Similarly, temperature sensors may be communicatively connected to local monitoring and/or recording devices that may be consulted during periods when knowledge of reactor coolant levels are necessary.

As such, example embodiments and methods permit relatively direct monitoring of temperature conditions at multiple axial positions and potentially multiple radial/quadrant positions within a nuclear core 15 and reactor 10. Using instrumentation tubes, example embodiments and methods may be separated from reactor internals so as to remain relatively unaffected and capable of temperature measurement during most transient scenarios and/or throughout most points of transient scenarios that ultimately damage instrumentation tubes. Temperatures may be readily indicative of coolant levels, coolant condition, and/or fuel failure within the reactor and supplement or replace reliance on potentially inaccurate downcomer fluid level measurement. By more accurately determining reactor conditions, damage, and/or coolant levels through example embodiments and methods, operators may better respond to various operating scenarios and/or better understand reactor damage or potential for the same.

Although vessel 10 is illustrated with components commonly found in a commercial Boiling Water Reactor, example embodiments and methods are useable with several different types of reactors having instrumentation tubes 50 or other access tubes that extend into the reactor. For example, Pressurized Water Reactors, Heavy-Water Reactors, Graphite-Moderated Reactors, etc. having a power rating from below 100 Megawatts-electric to several Gigawatts-electric and having instrumentation tubes at several different positions from those shown in FIG. 1 may be useable with example embodiments and methods. As such, instrumentation tubes useable in example methods may be at any geometry about the core that allows enclosed access to various types of reactors for temperature measurement in the same.

Example embodiments and methods thus being described, it will be appreciated by one skilled in the art that example embodiments may be varied and substituted through routine experimentation while still falling within the scope of the following claims. For example, although some example embodiments are described with temperature sensors that fairly directly measure temperature in nuclear reactors, temperature sensors that derive temperature by directly measuring other core conditions, such as material expansion or thermal energy radiance, are useable in example embodiments and methods. Further, it is understood that example embodiments and methods can be used in connection with any reactor where instrumentation tube temperatures can be used to detect reactor conditions such as coolant levels. Such variations are not to be regarded as departure from the scope of the following claims.

What is claimed is:

1. A temperature sensor array comprising:
   a plurality of temperature sensors including twelve passive thermocouples each spaced apart from one another by at least one foot on an axis and each having a width perpendicular to the axis of less than one inch, wherein the temperature sensors,
   are configured to be inserted into an instrumentation tube within a nuclear reactor so that the axis extends in the instrumentation tube and the temperature sensors are spaced in the instrumentation tube,
   measure temperatures of the instrumentation tube from about 100 degrees Fahrenheit to about 3000 degrees Fahrenheit, and include only materials with melting temperatures and cross-sections such that the temperature sensors do not fail within an operating or transient nuclear reactor environment.

2. The array of claim 1, further comprising:
an axial column to which the plurality of temperature sensors are attached, wherein the axial column is configured to be inserted into the instrumentation tube.

3. The array of claim 2, wherein the axial column is a continuous and flexible metallic rod.

4. The array of claim 1, further comprising:
at least one communicative connector configured to transmit data from at least one of the temperature sensors to a remote monitor.

5. The array of claim 1, wherein the plurality of temperature sensors are thermocouples configured to measure temperature without an external power source.

6. The array of claim 1, wherein the plurality of temperature sensors are bare along the axis.

7. The array of claim 1, wherein the nuclear reactor is a boiling water reactor.

8. The array of claim 1, wherein the temperature sensors are further configured to measure a temperature range including normal operating temperatures of the nuclear reactor and temperatures associated with absence of coolant in a transient scenario of the nuclear reactor.

9. A nuclear reactor comprising:
a core containing nuclear fuel;
an instrumentation tube extending into the core, wherein the instrumentation tube has an opening outside the reactor to permit enclosed access to the core; and
a temperature sensor array extending into the instrumentation tube, wherein the temperature sensor array includes a plurality of temperature sensors including twelve passive thermocouples each aligned at different axial positions of the instrumentation tube at least one foot apart from each other and each having a width perpendicular to the instrumentation tube of less than one inch, and wherein the temperature sensors are uninsulated from the instrumentation tube in order to measure thermal temperature of the reactor.

10. The nuclear reactor of claim 9, wherein the temperature sensor array further includes,
an axial column to which the plurality of temperature sensors are attached at the different axial positions, and
at least one communicative connector extending outside the instrumentation tube and configured to transmit data from at least one of the temperature sensors to a remote monitor.

11. The nuclear reactor of claim 10, wherein the plurality of temperature sensors are aligned and spaced along the axial column so as to be present at a plurality of axial levels within the core.

12. The nuclear reactor of claim 9, wherein the plurality of temperature sensors are passive thermocouples configured to measure a temperature range of the instrumentation tube including normal operating temperatures of the nuclear reactor and temperatures associated with absence of coolant in a transient scenario of the nuclear reactor.

13. The nuclear reactor of claim 12, wherein the nuclear reactor is a boiling water reactor, and wherein the reactor further comprises:
a plurality of instrumentation tubes extending into the core, wherein each instrumentation tube has an opening outside the reactor to permit enclosed access to the core; and
a plurality of the temperature sensor arrays each extending into a respective instrumentation tube of the plurality of instrumentation tubes, wherein the temperature range is from approximately 100 degrees Fahrenheit to approximately 3000 degrees Fahrenheit.

14. A method of monitoring a nuclear reactor, the method comprising:
installing a plurality of temperature sensors including twelve passive thermocouples each at different axial positions at least one foot apart from each other within an instrumentation tube of the nuclear reactor and having a width perpendicular to the instrumentation tube of less than one inch, wherein the temperature sensors measure a temperature of the instrumentation tube ranging from normal operating temperatures of the nuclear reactor to temperatures associated with absence of coolant in a transient scenario of the nuclear reactor.

15. The method of claim 14, wherein the temperature ranges from approximately 100 degrees Fahrenheit to approximately 3000 degrees Fahrenheit, the method further comprising:
determining a coolant level in the nuclear reactor from temperatures measured by the plurality of temperature sensors.

16. The method of claim 15, wherein the determining includes correlating a threshold temperature to an absence of coolant condition and comparing the temperatures measured by the plurality of temperature sensors to the threshold temperature.

17. The method of claim 15, wherein the determining is performed in real-time and determines a current coolant level in the nuclear reactor.

18. The method of claim 14, wherein the installing includes inserting a temperature sensor array containing the plurality of temperature sensors aligned at different axial positions into the instrumentation tube.

19. The method of claim 14, wherein the temperature sensors are uninsulated from the instrumentation tube and measure temperature throughout the range passively with heat applied only from the reactor.

* * * * *